United States Patent [19]

Gordon

[11] 4,235,115
[45] Nov. 25, 1980

[54] ELECTRIC WELDING

[75] Inventor: Stanley H. Gordon, Concord, Mass.

[73] Assignee: Thomson General Corporation, Burlington, Mass.

[21] Appl. No.: 945,431

[22] Filed: Sep. 25, 1978

[51] Int. Cl.³ .............................................. G05G 17/00
[52] U.S. Cl. .............................................. 74/2; 185/37; 219/101
[58] Field of Search ................... 74/2; 185/37; 219/97, 219/100, 101, 103

[56] References Cited
U.S. PATENT DOCUMENTS

| 2,499,281 | 2/1950 | Riley ................................. 219/97 |
| 2,781,026 | 2/1957 | Schlatter et al. ................. 219/97 X |
| 3,174,324 | 3/1965 | Ostertag ............................. 74/2 |

Primary Examiner—Allan D. Herrmann

[57] ABSTRACT

A flash butt welder with an operating lever connected to the movable platen and control mechanism therefor including a rotatable cam member having an arcuate cam surface with a flash portion followed by a radially inwardly extending upset portion, a cam member driving wheel mounted on the operating lever in contact with the flash portion of the cam surface for rotating the cam member and a snubbing device for controlling the rotation of the same member.

10 Claims, 4 Drawing Figures

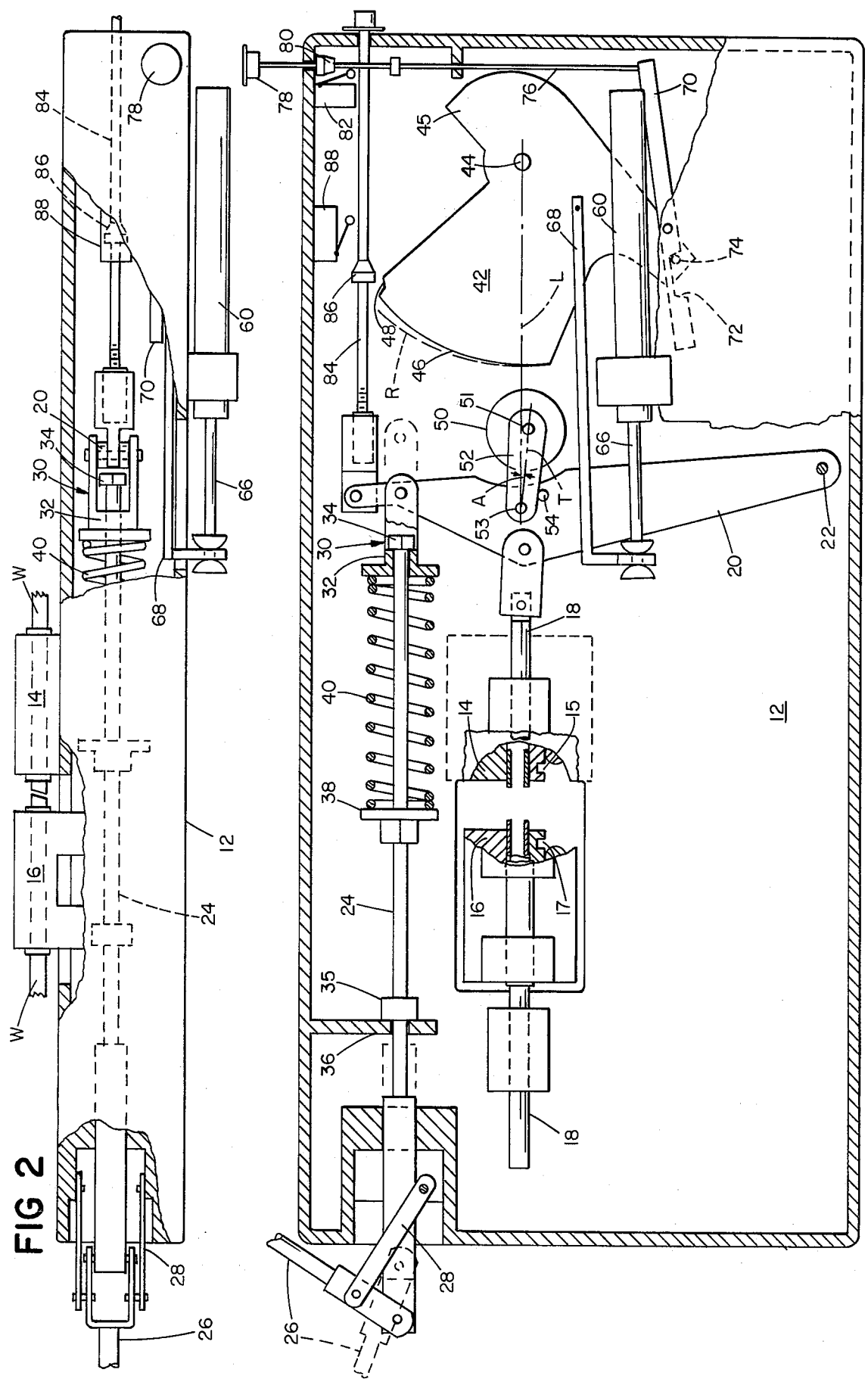

ELECTRIC WELDING

This invention relates to electric welding and, more particularly, to platen driving and control mechanism for a flash-butt welder.

Flash butt welders have usually heretofore required electrical or hydraulic motors for their operation, generally both for moving the movable platen and for operating its control mechanism for flash and upset motion. These have added to the expense of such welders, both of manufacture and operation. There has, however, been a need for a less expensive flash butt welder, particularly for light duty welding of workpieces of relatively small cross-section, which has not been met by conventional flash butt welders. There has also been a need for such a welder which can be operated from conventional power sources, without the need for high voltage and current sources required by the conventional welder.

Accordingly, it is a major object of the present invention to provide a novel flash butt welder which does not require electric or hydraulic motors for its operation, but which can be manually operated.

It is another object of the invention to provide a novel control mechanism for a flash-butt welder which does not require electric or hydraulic motors for its operation.

It is still another object of the invention to provide an improved control mechanism for a flash-butt welder for more rapid transition from flash to upset movement of its movable platen.

In order to accomplish the above objects, the present invention provides novel platen driving and control mechanism for a flash butt welder having a relatively fixed platen and a movable platen supported for flash and continuing upset movement adjacent the relatively fixed platen. The mechanism has an operating lever, rotatable about a fixed pivot, connected to the movable platen to move it between fully retracted and upset positions and novel control means for controlling the rate of advance of the lever and movable platen.

The control means includes a cam member, mounted adjacent the operating lever for rotation about a fixed pivot axis, having an arcuate cam surface with a flash portion followed by a radially inwardly extending upset portion. For rotating the cam member about its axis, a cam member driving wheel is mounted on the operating lever for operating contact with the flash portion of the arcuate cam surface from an initial position of the operating lever to its upset position. The cam member driving wheel may be mounted on the free end of a link means having its other end pivotally mounted on the operating lever for swinging movement from a trailing angle position when the wheel is in contact with the flash portion of the cam member to an overcenter position when the wheel rolls off the flash portion to the upset portion. A snubbing means, preferably a fluid cylinder, is connected to the rotatable cam member for controlling its rate of rotation.

Power means, preferably a manually compressible spring, is connected to the operating lever for moving it and the movable platen from an initial cocked position with the cam member driving wheel in contact with the cam member flash portion to the upset position.

Preferably, releasable latch means engaging the cam member is provided for retaining it, the operating lever and the movable platen in the initial cocked position, as well as reset lever means. The latter may be connected to the power spring and to the operating lever for compressing the power spring and moving the operating lever from its upset to its initial cocked position, where it is retained by the releasable latch means, and for releasing the power spring to reset the operating lever and the movable platen in the initial cocked position with the cam member driving wheel in contact with the flash portion of the cam member.

For the purpose of more fully explaining the above and still further objects and features of the invention, reference is now made to the following detailed description of a preferred embodiment thereof, together with the accompanying drawings, wherein:

FIG. 1 is a side view, partly in section, of the welder of the invention, shown with its mechanism in retracted position;

FIG. 2 is a top view, partly in section, of the welder of FIG. 1, shown with its mechanism in initial cocked position;

Figure 4:
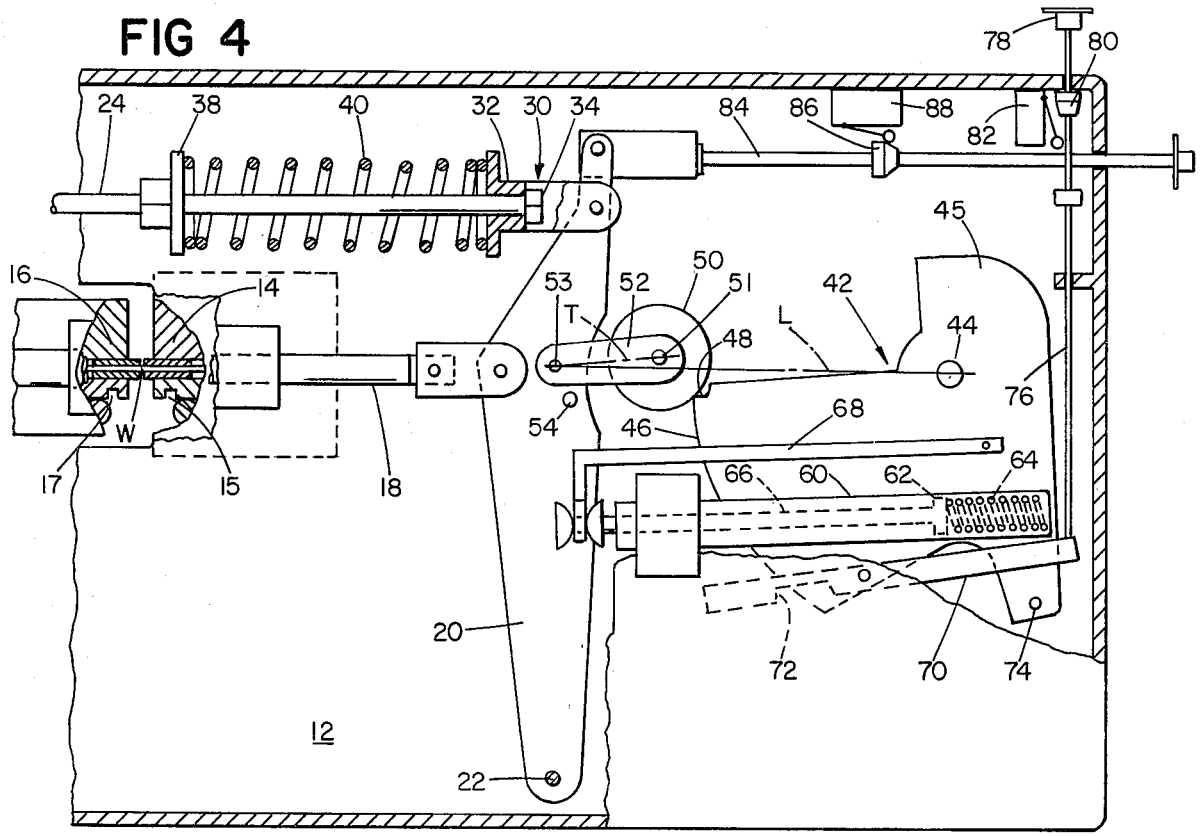
FIG. 4 is a partial side view, partly broken away and in section, of the welder of FIG. 1, shown with its mechanism in upset position.

Referring to the drawings, the welder in which the platen driving and control mechanism of the invention is incorporated has a main frame including a vertical plate 12 on which its operating elements are mounted. Its conventional elements include fixed platen 14 and movable platen 16 having suitable clamps 15 and 17, respectively, and electrical connections (not shown). Movable platen 16 is supported on plate 12 in conventional manner for flash and continuing upset movement adjacent fixed platen 14 and is moved through its connecting rod 18 connected to operating lever 20 between a fully retracted position (FIG. 1) and an upset position (FIG. 4).

Operating lever 20 is mounted at its lower end on frame plate 12 for rotation about a fixed pivot axis 22. Adjacent its upper end is pivotally connected clevis 30 to which is connected operating rod 24 which extends through a bore in the closed end portion 32 of clevis 30 and has an enlarged end portion 34 within said clevis. The other end of operating rod 24 extends outwardly beyond frame plate 12 and has pivotally connected thereto reset and cocking lever 26. Link 28 is pivotally connected both to frame plate 12 and to a point on reset and cocking lever 26 spaced between its ends. Operating rod 24 has mounted thereon a stop 35 cooperating with an abutment 36 on frame plate 12. It also has mounted thereon a flange 38 spaced from the closed end portion 32 of clevis 30, with a compression power spring 40 positioned therebetween for driving the mechanism, as hereinafter more fully explained.

Figure 3:
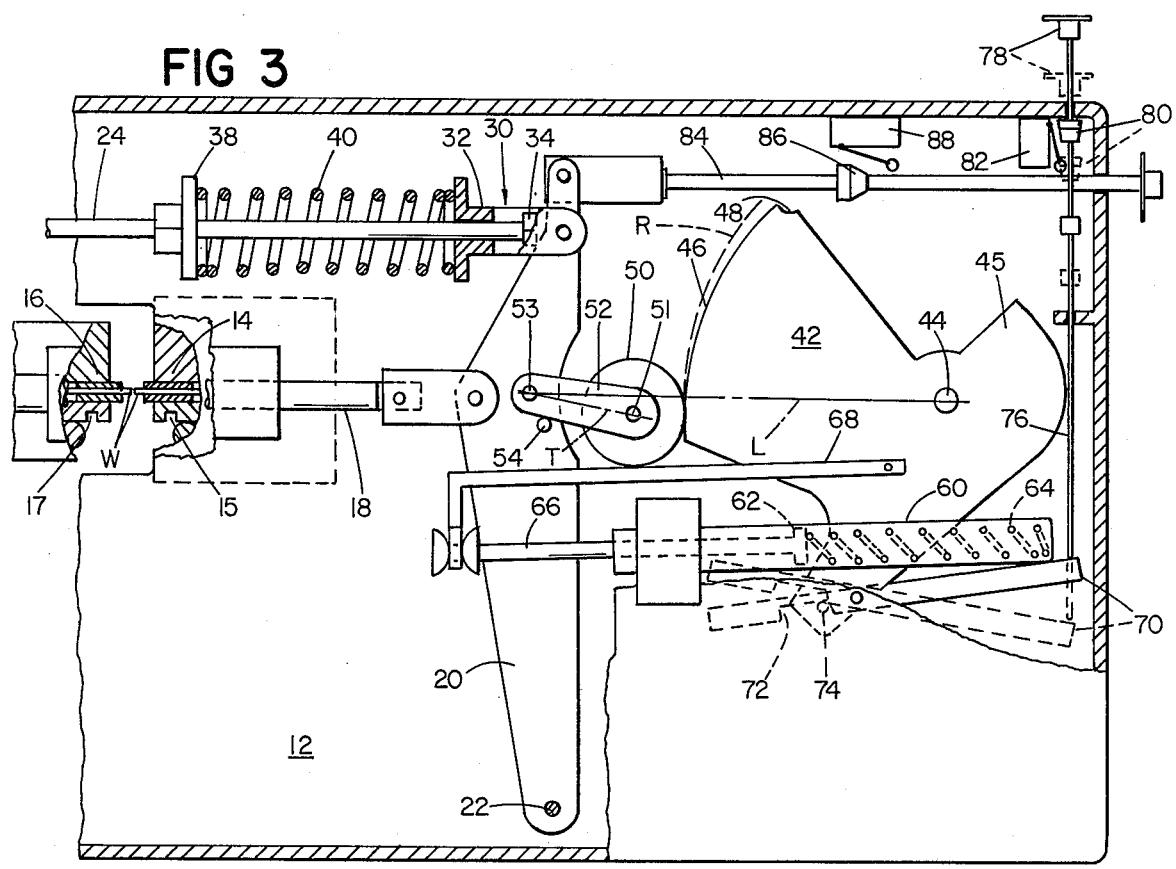
FIG. 3 is a partial side view, partly in section, of the welder of FIG. 1, also shown with its mechanism in initial cocked position.

For controlling the rate of advance of operating lever 20 and movable platen 16, there is provided a cam member, generally designated 42, mounted adjacent operating lever 20 on frame plate 12 for free rotation about its pivot axis 44. Cam member 42 has an arcuate cam surface comprising a flash portion 46 followed by a radially inwardly extending upset portion 48. Flash portion 46 slopes radially inwardly from its beginning at an angle of about four degrees increasing to about fourteen degrees at its end at upset portion 48, as shown in FIGS. 1 and 3 by comparison with constant radius line R. In addition, cam member 42 is preferably provided with a weight 45 to normally restore it to its initial position as shown in FIG. 1.

For driving cam member 42, a driving wheel 50 is provided pivotally mounted for rotation about pivot axis 51 on the free end of link 52, the other end of which is pivotally mounted on operating lever 20 for rotation about pivot axis 53. For holding link 52 in proper operating position by gravity, a stop 54 is provided on lever 20, stop 54 being positioned such that wheel pivot axis 51 will be positioned below a line L passing through link pivot axis 53 and cam member pivot axis 44 to provide a trailing angle position of said wheel with respect to cam member flash portion 46. Such trailing angle A, as measured between line L and a line T passing through pivot axes 51 and 53, may be about 5 to 10 degrees. For reasons hereinafter more fully explained, link 52 should be free to swing upwardly to an overcenter position with pivot 51 above line L.

For controlling the rate of rotation of cam member 42, a snubbing device in the form of a fluid cylinder, generally designated 60, is provided mounted on frame plate 12. It includes a piston 62 having a fluid orifice and opposed by a spring 64 (FIGS. 3 and 4). The piston rod 66 is pivotally attached at its free end to a link 68 pivotally mounted on cam member 42.

A releasable latch is provided for retaining cam member 42 in its initial position as shown in FIG. 1. The latch includes a latch lever 70 pivotally mounted on frame plate 12 having on one end thereof a notch 72 for engaging a pin 74 on cam member 42. A trip rod 76 is connected to the opposite end of latch lever 70, said trip rod extending vertically beyond frame plate 12 and having a handle 78 on its upper end.

For controlling the welding current current flow, trip rod 76 may be provided with a switch element 80 for contacting a microswitch 82 to start the flow of current when it is tripped by handle 78 and operating lever 20 may be provided with a current cut-off rod 84 having a switch element 86 for contacting a microswitch 88 to cut off the flow of current. The electrical components controlled thereby are entirely conventional and need not be shown and described.

In operation, referring first to FIG. 1, the mechanism is shown in its retracted position, with the clamps 15 and 17 open to receive the workpieces W (FIGS. 2, 3 and 4) to be welded. Reset and cocking handle 26 is in its retracted position, as is shown in full lines in FIG. 1, with stop 35 on operating rod 24 in contact with abutment 36 and driving wheel 50 out of contact with cam member 42 so that the latter is free to rotate by gravity to its initial position where it is shown latched with pin 74 on cam member 42 in notch 72 of latch lever 70. Handle 78 of trip rod 76 is in its raised position.

Referring next to FIGS. 2 and 3, the mechanism is shown in its cocked position after reset and cocking lever 26 has been manually moved to its dotted line position as shown in FIG. 1 and its full line position as shown in FIG. 2 to compress spring 40 and rotate operating lever 20 until driving wheel 50 is in contact with the beginning of cam member flash portion 46. However, cam member 42 is prevented from rotating, since it is still latched. Although further movement of operating lever 20 is prevented by the contact of wheel 50 with cam member 42, the movement of the enlarged end 34 of operating rod 24 from the end portion 32 of clevis 30 so that they are spaced from one another makes possible the further movement of operating lever 20 to drive cam member 42 after release of the latch by pushing down on trip rod handle 78, so that the latch is in its dotted line position as shown in FIG. 3.

When the latch is released, spring 40 continues to exert its force through operating lever 20 and driving wheel 50 against the beginning of cam member flash portion 46. Because of the decreasing radius of flash portion 46 in the direction of upset portion 48, as shown by comparison with the constant radius line R on FIGS. 1 and 3, the force exerted by driving wheel 50 causes cam member 42 to rotate about its axis 44 from its initial position, with driving wheel 50 at the beginning of its flash portion 46, along its flash portion 46, under the control of fluid cylinder 60.

Referring now to FIG. 4, as driving wheel 50 rolls off flash portion 46 onto upset portion 48 of cam member 42, it quickly moves overcenter, so that the pivot 51 of wheel 50 is above line L. This action provides the desired quick upset motion. Further movement of operating lever 20 is prevented when the enlarged end 34 of operating rod 24 contacts closed end 32 of clevis 30. Clamps 15 and 17 may then be opened to remove the welded workpieces.

To reset the mechanism to its position as shown in FIG. 1, it is merely necessary to move reset and cocking handle 26 back to its full line position as shown in FIG. 1. This allows the cam member 42 to rotate by gravity back to its initial position where it will be automatically latched.

What is claimed is:

1. Platen driving and control mechanism for a flash-butt welder having a relatively fixed platen and a movable platen supported for flash and continuing upset movement adjacent said relatively fixed platen, comprising
   an operating lever rotatable about a fixed pivot and connected to said movable platen to move said movable platen between a fully retracted position and the upset position
   control means for controlling the rate of advance of said lever and the platen actuated thereby, including
   a cam member having an arcuate cam surface with a flash portion followed by a radially inwardly extending upset portion, said cam member being mounted adjacent said operating lever and being driven therefrom for rotation about a fixed pivot axis
   a cam member driving wheel mounted on said operating lever in operating contact with said flash portion of said arcuate cam surface for rotating said cam member about its axis
   snubbing means for controlling the rate of rotation of said rotatable cam member, and
   power means connected to said operating lever for moving said lever and said movable platen between said retracted and upset positions and rotatably driving said cam member.

2. Platen driving and control mechanism as claimed in claim 1, wherein
   said cam member driving wheel is mounted on link means pivotally mounted on said operating lever for swinging movement from a trailing angle position when said wheel is in contact with said cam member flash portion to an overcenter position when said wheel rolls off said flash portion to said upset portion.

3. Platen driving and control mechanism as claimed in claims 1 or 2, wherein said power means includes spring means for moving said operating lever and movable platen between an initial position and said upset position.

4. Platen driving and control mechanism as claimed in claim 3, further including
  releasable latch means for retaining said operating lever and movable platen in said initial position.

5. Platen driving and control mechanism as claimed in claims 1 or 2, further including
  reset means connected to said operating lever for moving said operating lever from said upset position to said fully retracted position and resetting said operating lever and said movable platen in said initial position.

6. Platen driving and control mechanism for a flash-butt welder having a relatively fixed platen and a movable platen supported for flash and continuing upset movement adjacent said relatively fixed platen, comprising
  an operating lever rotatable about a fixed pivot and connected to said movable platen to move said movable platen between a fully retracted position and an upset position
  control means for controlling the rate of advance of said lever and said movable platen, including
  a cam member having an arcuate cam surface with a flash portion followed by a radially inwardly extending upset portion, said cam member being mounted adjacent said operating lever and being driven therefrom for rotation about a fixed pivot axis
  a cam member driving wheel mounted on said operating lever for operating contact with said flash portion of said arcuate cam surface from an initial position of said operating lever to said upset position for rotating said cam member about its axis
  snubbing means for controlling the rate of rotation of said rotatable cam member
  power spring means connected to said operating lever for moving said operating lever and movable platen from an initial cocked position with said cam member driving wheel in contact with said cam member flash portion to said upset position and rotatably driving said cam member
  releasable latch means for retaining said cam member, said operating lever and said movable platen in said initial cocked position, and
  reset lever means connected to said power spring means and to said operating lever for compressing said power spring means and moving said operating lever from said upset position to said fully retracted position for rotation of said cam member from its upset position to its initial cocked position retained by said releasable latch means and for releasing said power spring means to reset said operating lever and said movable platen in said initial cocked position with said cam member driving wheel in contact with said cam member flash portion.

7. Platen driving and control mechanism as claimed in claim 6, wherein
  said cam member driving wheel is mounted on the free end of link means having its other end pivotally mounted on said operating lever for swinging movement from a trailing angle position when said wheel is in contact with said cam member flash portion to an overcenter position when said wheel rolls off said flash portion to said upset portion.

8. Platen driving and control mechanism as claimed in claims 6 or 7, wherein
  said snubbing means is a fluid cylinder connected to said rotatable cam surface member for controlling its rate of rotation.

9. Platen driving and control mechanism as claimed in claims 6 or 7, wherein
  said releasable latch means engages said cam member.

10. Platen driving and control mechanism for a flash-butt welder having a relatively fixed platen and a movable platen supported for flash and continuing upset movement adjacent said relatively fixed platen, comprising
  a frame
  a generally vertically extending operating lever having its lower end pivitolly mounted on said frame, said lever being rotatable about a fixed pivot axis and being connected to said movable platen to move said movable platen between a fully retracted position and an upset position
  control means for controlling the rate of advance of said lever and said movable platen, including
  a cam member having an arcuate cam surface with a flash portion followed by a radially inwardly extending upset portion, said cam member being mounted on said frame adjacent said operating lever and being driven therefrom for rotation about a fixed pivot axis and being normally positioned by gravity in an initial position
  a cam member driving wheel mounted on said operating lever for operating contact with said flash portion of said arcuate cam surface from said initial position to said upset position for rotating said cam member about its axis, said cam member driving wheel being mounted on the free end of link means having its other end pivotally mounted on said operating lever for swinging movement from a trailing angle position when said wheel is in contact with said cam member flash portion to an overcenter position when said wheel rolls off said flash portion to said upset portion
  a fluid cylinder connected between said frame and said rotatable cam surface member for controlling its rate of rotation
  power spring means connected between said frame and said operating lever for moving said operating lever and movable platen from said initial position with said cam member driving wheel in contact with said cam member flash portion of said cam member to said upset position and rotatably driving said cam member
  releasable latch means engaging said cam member for retaining said cam member, said operating lever and said movable platen cocked in said initial position, and
  reset lever means connected to said power spring means and to said operating lever for compressing said power spring means and moving said operating lever from said upset position to said fully retracted position for gravity rotation of said cam member from its upset position to its initial position retained by said releasable latch means and for releasing said power spring means to reset said operating lever and said movable platen cocked in said initial position with said cam member driving wheel in contact with said cam member flash portion.

* * * * *